Oct. 27, 1964        F. L. WATROUS        3,154,759
RHEOSTAT
Filed May 27, 1963

INVENTOR.
FLOYD L. WATROUS
BY
Lockwood, Woodard, Smith & Weikart
Attorneys

United States Patent Office 3,154,759
Patented Oct. 27, 1964

3,154,759
RHEOSTAT
Floyd L. Watrous, Pierceton, Ind., assignor to Model Engineering & Manufacturing Corp., Huntington, Ind., a corporation of Indiana
Filed May 27, 1963, Ser. No. 283,289
6 Claims. (Cl. 338—162)

This invention relates generally to rheostats and more particularly to a rotary type of rheostat or potentiometer having conveniently adjustable means for limiting the available amount of rotational travel of the wiper arm.

In many instances, standardization of parts in manufactured devices is desirable. There is equipment manufactured in which several rheostats are required, though the range of variable resistance of one should be less than the range of variable resistance of another. Standardization of rheostats used in the several applications could be achieved if there were means whereby the amount of possible variation in resistance of each could readily be established.

It is, therefore, a general object of the present invention to provide an improved rheostat.

A further object is to provide a rheostat having easily adjustable means for establishing a predetermined range of variable resistance.

A further object of the present invention is to provide a rheostat achieving the foregoing objects and wherein the degree of wiper rotation available can be changed readily by a simple adjustment.

It is a still further object to provide means whereby a rheostat which is standard in many respects can be provided with the feature of readily adjustable degrees of wiper rotation.

The full nature of the invention will be understood from the accompanying drawings and the following description and claims.

Figure 1:
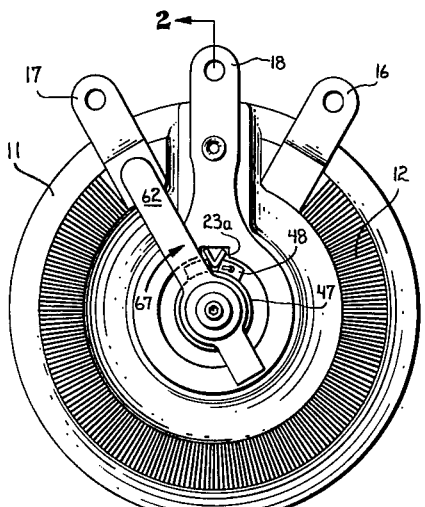
FIG. 1 is a view of a rheostat according to the present invention.

Referring to the drawings in detail, the illustrated embodiment of the invention includes a ceramic body 11 having a resistance winding 12. The major portion of each turn of the winding is embedded in the body with a portion 13 of each turn being exposed in a plane perpendicular to the axis 14 of the assembly. Terminals 16 and 17 are connected to opposite ends of the winding 12. A third terminal 18 is mounted to the body 11 by means of the rivet 19. The terminal 18 has an integral contact ring 21 which is supported concentric with the axis 14, with the surface 21a thereof exposed for engagement by a portion of the wiper arm.

A hexagonal recess 20 is provided in the body 11 and receives the hexagonal portion 22 of an abutment member 23 as well as the hexagonal end 24 of a bushing 26. The front end of the bushing has threads 27 thereon which receive the lock nut 28 by which the combination of the abutment member and bushing are secured to the body.

The bushing bore 29 receives the shaft 31. The portion of the shaft extending from the front of the bushing has a flat 32 for engagement by a locking device of a knob (not shown). The shaft is inserted through the rear end of the bushing and a lock ring 43 is placed in the groove 44 of the shaft to retain the shaft in the bushing.

According to the present invention, a lug 46 is secured to the shaft and the front face 46a of the lug is engageable with the rear face 24a of the hexagonal flange of the bushing 26. The axial position of the shaft is thereby maintained by the lug 46 and the snap ring 43, both of which are engageable with the bushing.

A collar 47 is received on the shaft and includes a lug 48 extending radially outwardly therefrom. A lock ring 49 in the shaft groove 51 positions the collar so that the lug 48 is disposed in engageable relation with the abutment 23. A spring 52 is disposed around the shaft and includes a forward hook 53 passing through an aperture in the lug 46 and a rear hook 54 passing through an aperture in the lug 48. This spring should be considered to be in a stressed condition such that if the hooks were removed from the lugs 46 and 48, the spring would uncoil. This description is not intended to indicate the degree of stress of the spring but only the direction. In other words, the spring tends to expand rather than contract.

Means for locking the collar in a fixed rotational position with respect to the shaft are provided. A transverse set pin 56 has a tapered surface 57 engaging the tapered surface 58 of an axially extending set pin 59. A setscrew 61, threadedly received in the rear end of the shaft, is effective to drive the axial set pin 59 forward to push the transverse set pin 56 outwardly to tightly engage the bore of the collar 47.

A wiper arm 62 is mounted by means of the insulator 63 to the shaft 31 and has a winding contactor 64 engaging the exposed turns of the winding and has a contact tab 66 engaging the rear face 21a of the contact ring 21. Because of the fact that the contact ring is part of the terminal 18 which is riveted to the body and because of the fact that the distance from the support of the ring on the body is substantial, the contact ring has a considerable amount of spring action to it and will engage the tab 66 of the wiper during the entire rotational travel of the wiper. This is conventional rheostat practice. A tight fit of the insulator 63 on the shaft 31 is provided so that the position of the wiper on the shaft is securely maintained, once established.

To establish the desired degree of rotation of the shaft from the start position illustrated in FIG. 1, it is necessary to loosen the setscrew 61 so that the collar 47 is free to turn on the shaft. In this condition, the spring 52 will retain the lug 48 in engagement with the face 23a of the generally V-shaped abutment 23. The lug 46 will at this time be in engagement with the face 23b of the abutment. This prevents movement of the wiper arm in the direction of the arrow 67 from the position shown in FIG. 1 where the contactor 64 engages a portion of the terminal 17.

Figure 3:
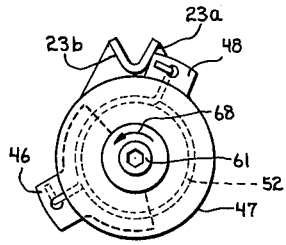
FIG. 3 is an enlarged view of a portion of the rheostat of FIG. 1 looking in the same direction as in FIG. 1 and illustrating the means of setting the adjustable stops.
Figure 4:
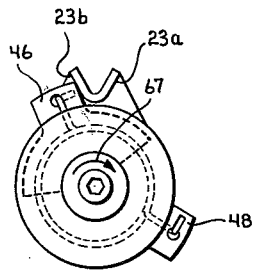
FIG. 4 is a view similar to FIG. 3 and shows the assembly of FIG. 2 rotated to its clockwise limit.
Figure 2:
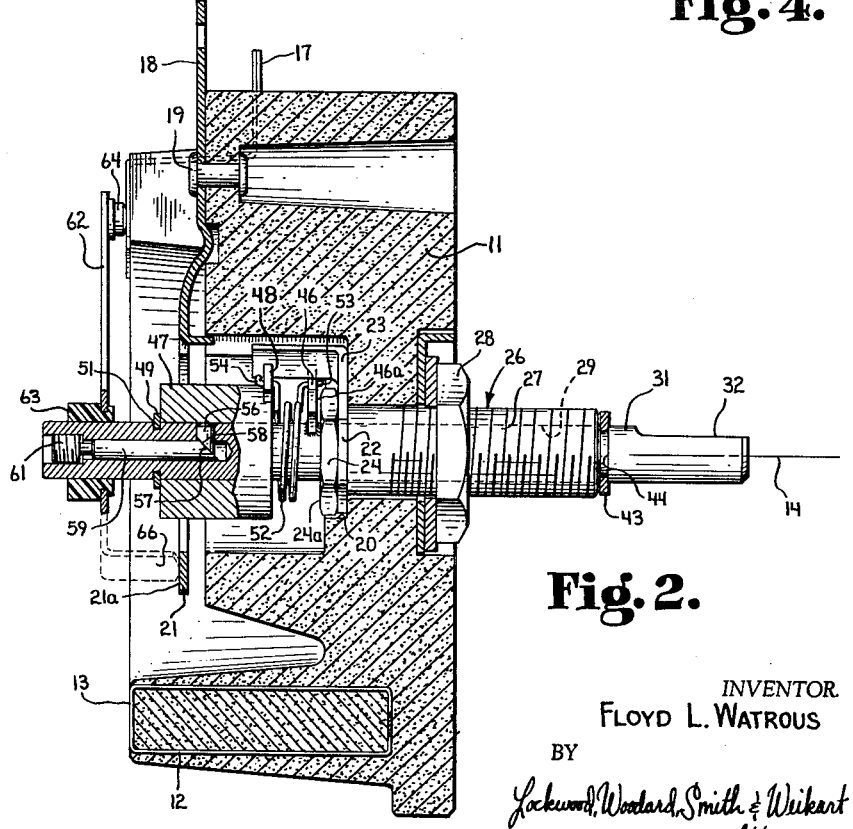
FIG. 2 is an enlarged vertical section taken along the line 2—2 in FIG. 1 and viewed in the direction of the arrows.

The shaft 31 is then turned in the direction designated by the arrow 68. It is turned to the extent desired to place the wiper contactor 64 in contact with the turns of the winding which will give the resistance desired between the terminal 18 and either of the other terminals 16 and 17. An example of such a position is illustrated in FIG. 3. As the shaft is turned, the lug 48 remains engaged with the face 23a of the abutment and the spring is wound more tightly. When the desired position has been established, the setscrew 61 is tightened whereupon the collar 47 is tightly secured to the shaft to prevent further relative rotation therebetween. The shaft may then be rotated in the direction of the arrow 67 back to the starting point as shown in FIG. 1 whereupon the lug 48 will have moved to the position shown in FIG. 4. Subsequent rotations of the shaft in the direction of the arrow 68 will then be limited by contact between the lug 48 and the face 23a of the abutment. However, if at any time it is desirable to increase or decrease the extent of possible shaft rotation, the setscrew 61 can be loosened and the lug 48 can then be set at the desired position by the same procedure as has just been described herein.

It will be appreciated from the foregoing description that the present invention accomplishes the objects set out herein as well as other objects and provides advantages not specifically mentioned herein. Of course, modifications can be made within the scope of the present invention.

Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A rheostat comprising a body having a winding and a wiper arm cooperating therewith, means for adjustably determining the sector of the winding traversed by the wiper arm, said means comprising an abutment fixed in said body, a shaft carrying said wiper arm and rotatably mounted in said body, said shaft having a lug affixed thereto and disposed in engageable relation to said abutment, a collar rotatably mounted on said shaft and having a lug extending therefrom in engageable relationship to said abutment, resilient means engaging said collar and said shaft and providing a bias to effect relative rotation between said collar and said shaft, and adjustable means in said shaft for locking said collar in a fixed rotational position on said shaft.

2. The rheostat of claim 1 wherein said adjustable means includes a transverse set pin in said shaft and a longitudinally extending set pin extending axially within the shaft and accessible at one end of the shaft, one of said pins having a tapered portion engaging the other of said pins, and a setscrew threadedly received in said one end of said shaft and engaging said axially extending set pin.

3. In a rheostat, a combination comprising: a body having fixed abutment means thereon, a shaft rotatably mounted to said body and having a first stop member affixed thereto and movable in a first circular path by rotation of said shaft, a collar mounted on said shaft and having a second stop member affixed thereto, said collar being rotatably mounted on said shaft whereby said second stop member is movable in a second circular path by rotation of said collar on said shaft, said abutment means extending across said paths and abuttingly engageable by said stop members, resilient means engaging said shaft and said collar and biased to establish rotation of said collar relative to said shaft, and means engaging said collar and said shaft for locking said collar to said shaft.

4. A rheostat comprising: a body having a plurality of winding turns thereon, a shaft mounted for rotation in said body, a wiper arm secured to said shaft and engaging one of said winding turns, said shaft being operable when rotated to move said wiper arm over said winding turns, an abutment affixed to said body, a member rotatably mounted on said shaft for rotation on said shaft, said member having stop means thereon, said stop means being thereby movable in a circular path around said shaft, biasing means engaging said member and said shaft to establish rotation of said member relative to said shaft, and said abutment being disposed across said path in abuttingly engageable relationship to said stop means, and means for locking said rotatable member to said shaft.

5. The rheostat of claim 4 wherein said locking means means include first and second pins mounted in said shaft, said first pin engaging said second pin and said second pin being engageable with said rotatable member, a setscrew threadedly received on said shaft and engaging said first pin and operable therethrough to move said second pin into locking engagement with said rotatable member.

6. In a control apparatus having two cooperating elements movable with relation to each other, means for adjustably fixing the magnitude of relative motion of said elements, said means comprising a shaft having an axis of rotation and having one of said cooperating elements mounted thereto, said shaft being operative to rotationally move said one element when said shaft is rotated, a stop member affixed to said shaft, an additional stop member mounted on said shaft and rotatable with relation to said shaft about said axis, an abutment engageable by said stop members and immovable with relation to the other of said cooperating elements, resilient means biasing said stop members into abutting engagement with said abutment, and means for locking said additional stop member on said shaft at a position separated from said shaft-affixed stop member providing the desired magnitude of relative motion of said control elements as said shaft is rotated through an arc limited by engagement of said stop members with said abutment.

References Cited in the file of this patent

UNITED STATES PATENTS

| | | |
|---|---|---|
| 1,465,872 | Schoenung | Aug. 21, 1923 |
| 1,692,962 | Thompson | Nov. 27, 1928 |
| 2,427,239 | Taylor | Sept. 9, 1947 |
| 2,796,501 | Daily | June 18, 1957 |